(12) United States Patent
Aebischer et al.

(10) Patent No.: US 12,736,338 B2
(45) Date of Patent: Sep. 15, 2026

(54) IN-THE-FIELD LEVELING CALIBRATION OF A SURVEYING INSTRUMENT

(71) Applicant: HEXAGON INNOVATION HUB GMBH, Heerbrugg (CH)

(72) Inventors: Beat Aebischer, Heerbrugg (CH); Sybille Verena Komposch, Feldkirch (AT); Christian Niklaus, Bad Ragaz (CH); Philipp Lukas Rüst, Herisau (CH); Patrik Titus Töngi, Balgach (CH); Markus Wenk, Chur (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 475 days.

(21) Appl. No.: 18/378,108

(22) Filed: Oct. 9, 2023

(65) Prior Publication Data

US 2024/0125597 A1 Apr. 18, 2024

(30) Foreign Application Priority Data

Oct. 10, 2022 (EP) .................................... 22200554

(51) Int. Cl.
*G01C 5/00* (2006.01)
*G01C 15/00* (2006.01)

(52) U.S. Cl.
CPC ............. *G01C 5/00* (2013.01); *G01C 15/002* (2013.01)

(58) Field of Classification Search
CPC ... G01C 15/002; G01C 15/004; G01C 15/008
(Continued)

(56) References Cited

U.S. PATENT DOCUMENTS 5,212,889 A * 5/1993 Lysen .................. G01C 15/105 33/291
5,973,788 A 10/1999 Pettersen et al.
(Continued)

FOREIGN PATENT DOCUMENTS

CN 201892533 U 7/2011
DE 20 2006 005 643 U1 7/2006
(Continued)

OTHER PUBLICATIONS

Mark Pedley, "High-Precision Calibration of a Three-Axis Accelerometer," Freescale Semiconductor, (2015).
(Continued)

*Primary Examiner* — George B Bennett
(74) *Attorney, Agent, or Firm* — Maschoff Brennan

(57) ABSTRACT

A surveying instrument, comprising at least one rotational movement axis such as a azimuth axis, which is for providing a positioning of the measurement direction of the surveying instrument, a rotational position encoder configured for deriving a rotational direction value around the movement axis and an acceleration sensor such as a MEMS-accelerometer for deriving a leveling for the surveying instrument and being rotatable around the rotational movement axis in different rotational positions. The instrument further comprises a mechanism designed to move the accelerometer from a first orientation in at least a second orientation, the second orientation being different to the first orientation, wherein the mechanism is designed and arranged in such a way that the targeting direction is uninfluenced by a movement of the accelerometer by the mechanism, and an evaluation unit configured to derive a calibrated leveling for the instrument.

18 Claims, 10 Drawing Sheets

(58) Field of Classification Search
USPC .......................................... 33/290, 291, 292
See application file for complete search history.

(56) References Cited

U.S. PATENT DOCUMENTS

| | | | | |
|---|---|---|---|---|
| 6,138,367 | A * | 10/2000 | Raby | G01C 1/02 33/290 |
| 6,504,602 | B1 | 1/2003 | Hinderling | |
| 6,516,286 | B1 | 2/2003 | Aebischer et al. | |
| 6,864,966 | B2 | 3/2005 | Giger | |
| 6,873,407 | B2 | 3/2005 | Vogel | |
| 7,643,955 | B2 | 1/2010 | Weilenmann | |
| 7,864,303 | B1 | 1/2011 | Benz et al. | |
| 7,911,589 | B2 | 3/2011 | Siercks | |
| 7,946,044 | B2 * | 5/2011 | Kludas | G01C 1/04 33/291 |
| 7,982,859 | B2 | 7/2011 | Hinderling et al. | |
| 8,031,331 | B2 | 10/2011 | Meier et al. | |
| 8,365,424 | B2 | 2/2013 | Laabs et al. | |
| 8,525,983 | B2 * | 9/2013 | Bridges | G01C 15/002 356/612 |
| 8,772,719 | B2 | 7/2014 | Bockem et al. | |
| 9,194,698 | B2 | 11/2015 | Vogel et al. | |
| 9,273,958 | B2 * | 3/2016 | Gros | G01C 15/00 |
| 9,341,500 | B2 | 5/2016 | Lippuner et al. | |
| 10,048,377 | B2 * | 8/2018 | Ohtomo | G01S 17/42 |
| 11,293,754 | B2 * | 4/2022 | Hirano | G01C 15/008 |
| 11,500,096 | B2 * | 11/2022 | Nishita | G01S 7/4817 |
| 11,940,274 | B2 * | 3/2024 | Ohtomo | G01C 9/06 |
| 12,085,378 | B2 * | 9/2024 | Müller | G01B 11/002 |
| 12,228,401 | B2 * | 2/2025 | Kikuchi | G01C 15/14 |
| 2002/0138998 | A1 * | 10/2002 | Hamada | G01C 1/02 33/290 |
| 2009/0147319 | A1 | 6/2009 | Becker et al. | |
| 2010/0134596 | A1 | 6/2010 | Becker | |
| 2011/0080477 | A1 | 4/2011 | Trenary et al. | |
| 2012/0127455 | A1 | 5/2012 | Sharp | |
| 2014/0226145 | A1 | 8/2014 | Steffey et al. | |
| 2021/0293527 | A1 | 9/2021 | Khatuntsev | |
| 2023/0175844 | A1 | 6/2023 | Shoji et al. | |
| 2024/0103139 | A1 * | 3/2024 | Koehler | G01S 7/51 |

FOREIGN PATENT DOCUMENTS

| | | | | |
|---|---|---|---|---|
| EP | 0 440 833 | A1 | 8/1991 | |
| EP | 1 043 602 | A1 | 10/2000 | |
| EP | 1 081 459 | A1 | 3/2001 | |
| EP | 1 311 873 | A1 | 5/2003 | |
| EP | 1 450 128 | A1 | 8/2004 | |
| EP | 1 757 956 | A1 | 2/2007 | |
| EP | 1 882 959 | A1 | 1/2008 | |
| EP | 3 136 049 | A1 | 3/2017 | |
| EP | 3 812 701 | A1 | 4/2021 | |
| EP | 3839424 | A1 * | 6/2021 | G02B 7/023 |
| JP | 4843128 | B2 | 12/2011 | |
| WO | 2006/063739 | A1 | 6/2006 | |
| WO | 2007/079600 | A1 | 7/2007 | |
| WO | 2010/148525 | A1 | 12/2010 | |
| WO | 2011/064317 | A2 | 6/2011 | |
| WO | 2012/033892 | A1 | 3/2012 | |
| WO | 2021/205948 | A1 | 10/2021 | |

OTHER PUBLICATIONS

Extended European Search Report dated Mar. 31, 2023 as received in Application No. 22200554.8.

* cited by examiner

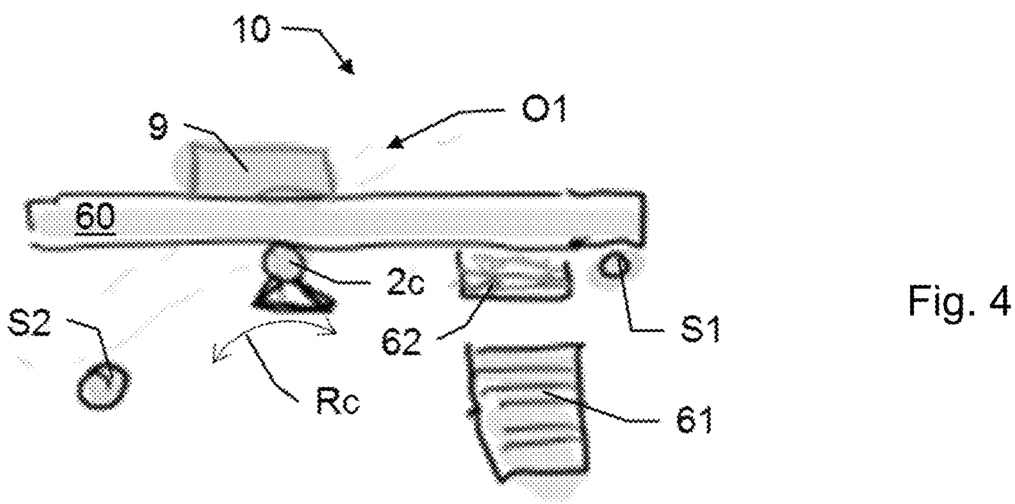
Fig. 4
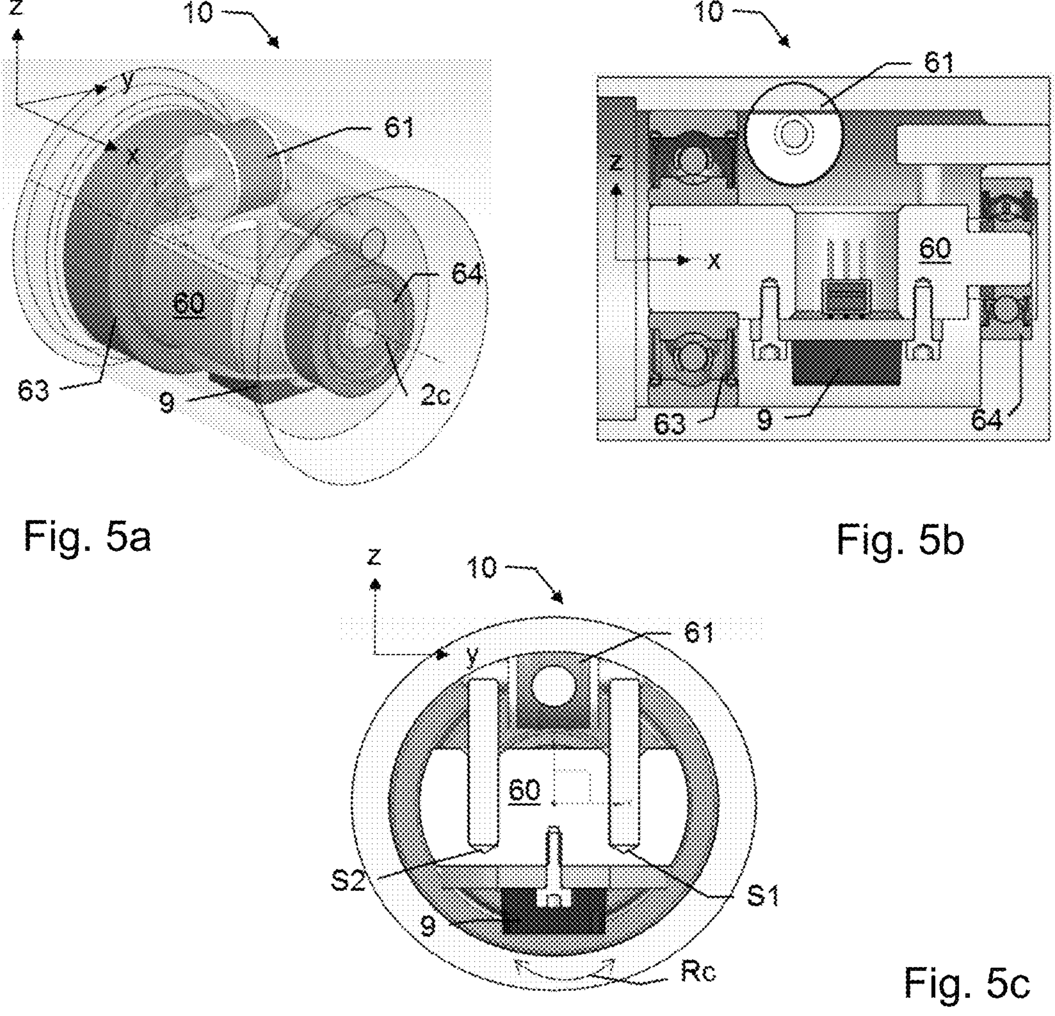
Fig. 5a
Fig. 5b
Fig. 5c

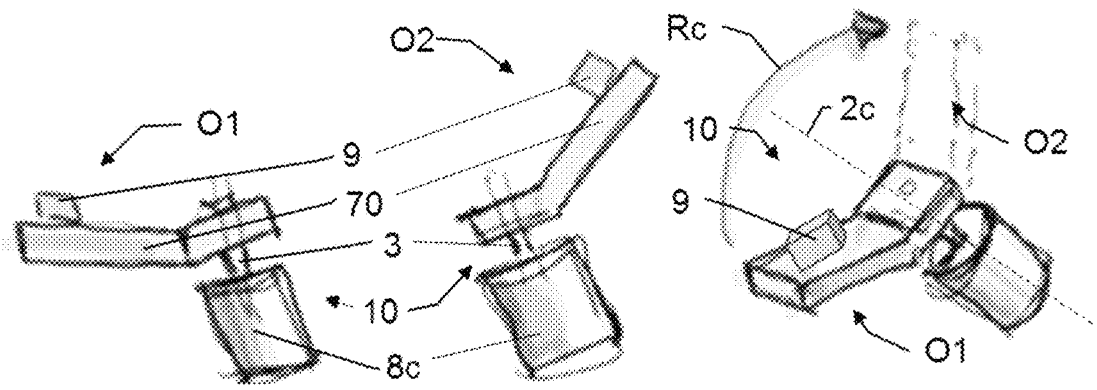
Fig. 6
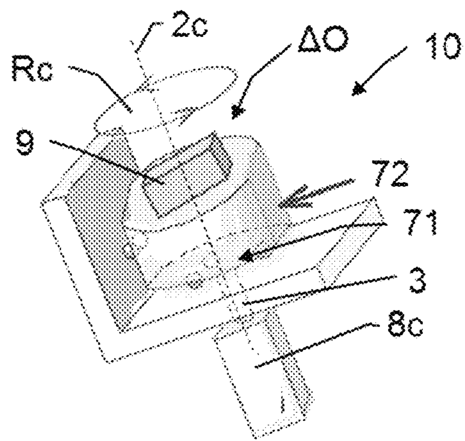
Fig. 7
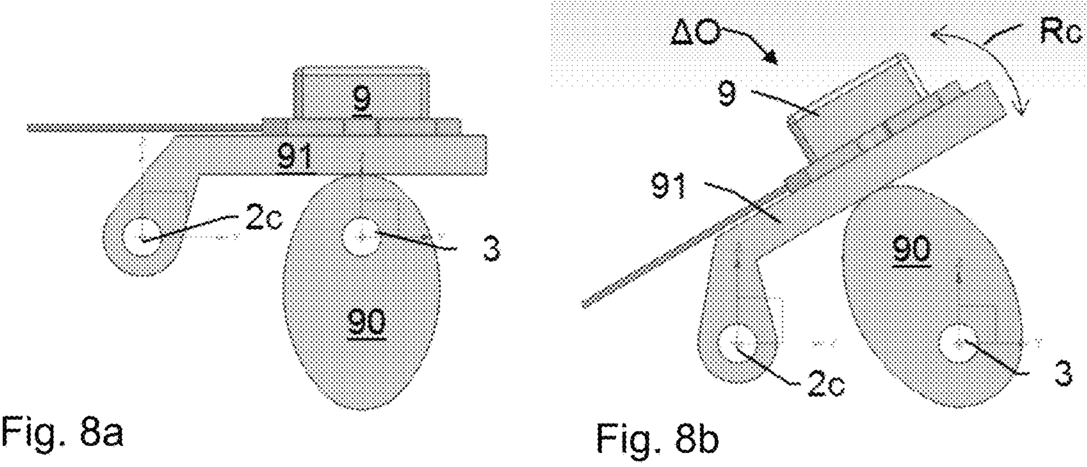
Fig. 8a
Fig. 8b

IN-THE-FIELD LEVELING CALIBRATION OF A SURVEYING INSTRUMENT

BACKGROUND

The disclosure relates to a surveying instrument according to the preamble of claim 1, such as a laser scanner, theodolite, total-station, laser rotator, layout-tool or laser-tracker, and to a corresponding method for a surveying instrument according to claim 9.

In the technical field of surveying, in particular in the area of geodesy, construction work or industrial measurements, instruments for a contactless measurement by a movable optical measurement axis are used. For instance by emitting optical radiation in a measurement direction towards a target point or target object to be surveyed, a spatial coordinate information of the target is derived or projected. For example, an angular position and optionally also a distance—i.e. polar coordinates of the target object—can be derived and further processed, for example to derive Cartesian, geodetic or geospatial coordinate information. The measurement results are provided with respect to a reference frame, often with respect to a geospatial reference, comprising a level or plumb information.

The direction of the measurement or targeting, e.g. in form of a measurement light beam in case of a laser scanner or in form of a crosshair in case of a theodolite, is therein aimed at or pointed to the target, for example by pivoting or rotating the measurement or targeting axis around two substantially orthogonal movement axes. The measurement direction can therein be evaluated as an angular information, for example by one or more encoders, protractors or goniometers at the measurement instrument, by which an angular position value reading of rotated parts of the instrument can be determined. The movements around the rotary axes of the instrument can be operated manually, but are preferably motorized by an electrical drive unit.

In many embodiments, also a distance can be derived by an electro-optical distance measurement by an EDM, LIDAR, Interferometer, etc. with an emitted electromagnetic radiation which is at least partly reflected back from a target to the instrument, where it is received and converted into an electrical signal for distance determination. For example, emitted optical radiation can be used for electro-optical distance measurement using a Time-Of-Flight-(TOF), Phase-, Wave-Form-Digitizer-(WFD) or interferometric measurement principles or a combination of these principles, as described in EP 1 757 956, JP 4 843 128, EP 1 311 873, EP 1 450 128, EP 1 882 959, EP 1 043 602, WO 2006/063739 or others. Besides measuring naturally existing targets, special target markers or retro-reflectors can be attached to the target object or mobile measuring rods or probes can be used as target objects, etc.

For example, motorized Theodolites or Tachymeters (often also referred to as Total-Stations) are used for surveying with geodetic accuracy. A measurement target is therein aimed by an optical and/or electronic visual viewfinder and/or by some automatic target recognition and/or aiming system. The aiming is achieved by pivoting or rotating a portion of the instrument, which is comprising the viewfinder and the distance measurement unit, along two orthogonal axes with respect to an instrument base that is e.g. stationed on a tripod or the like. An important criterion in those instruments is precision and accuracy of the measurements. In the field of land surveying, tachymeters or total stations with distance measurement accuracies of a few centimeters, millimeters or even less than one millimeter are used. The accuracy of angular measurements is usually within a range of less than two to ten angular seconds, preferably less than one or 0.5 angular seconds or less. Some embodiments of such instruments can e.g. be found in U.S. Pat. No. 6,873,407, CN 201892533, US 2011/080477, EP 1 081 459, US 2012/127455, U.S. Pat. No. 8,365,424, WO 2012/033892, WO 2007/079600, WO 2010/148525, or others.

As another example, 3D scanning is an effective technology to produce a point cloud of millions of spatial measuring points of objects within minutes or seconds. In principle, such laser scanners are designed to measure a distance to a measuring point by means of an electro-optical and laser-based range finder. A directional deflection unit is designed in such a way that the measuring beam of the rangefinder is deflected in at least two spatial directions, whereby a spatial measuring range can be recorded. The deflection unit is usually realized in the form of a moving mirror or other elements suitable for a controlled angular deflection of optical radiation, such as rotatable prisms, movable light guides, deformable optical components, etc. By a successive measurement of a multitude of points in distance and angle, i.e. in spherical coordinates (which can also be transformed into Cartesian coordinates for display and further processing), the point cloud is derived. An important aspect in those devices is the measurement speed of the gathering of the point cloud with a desired resolution and accuracy, usually in the range of some millimeters. Some embodiments of such Laser-Scanners can for example be found in DE 20 2006 005643 U1, US 2009/147319 or others.

Also laser trackers are cognate instruments, mostly used e.g. in industrial surveying, like for coordinative position determination of points of a component of a vehicle or machine. Such laser trackers are designed for position determination of a target point with a substantially continuous tracking of a retro-reflective target point, like a retroreflective unit (e.g. cube prism) which is targeted and followed by an optical measuring beam of the instrument by changing the orientation of a motorized deflection unit and/or by pivoting a portion of the instrument. Examples of laser tracker instruments are described in US 2014/0226145, WO 2007/079600, U.S. Pat. No. 5,973,788 or others.

In all those instruments, the measurement direction has to be derived precisely by angular measurement units like angular encoders at the movement axes of the surveying instrument. Encoders providing such high accuracy, e.g. at or below one arc second are known e.g. from EP 0 440 833, WO 2011/064317, etc. and often comprise various error compensation-, self-calibration-, sub-resolution interpolation-features, etc.

In order to establish an absolute and/or reproducible reference for the measurements, a horizontal or level plain, respectively a plumb-vertical is used. Such can be established by a mechanical leveling of the instrument itself during setup and/or by measuring a deviation from level and taking it into account numerically. Geodetic instruments are usually leveled, e.g. by a bubble level, a circular bubble, an oil pot sensor or another inclination sensor or by a combination of those. Another problem of the few available, highly accurate level-sensors such as e.g. oil pot sensors, is their limited measurement range. Therefore, a relatively exact physical leveling of the instrument (e.g. by a tribrach and a spirit level) is required at first hand to bring the actual level sensor into its working range. For precise applications, the tolerable setup-inclination is relatively low, wherefore the setup procedure can be burdensome and time consuming.

Accelerations sensors such as Microelectromechanical system accelerometers or inclinometers which can also be used to determine a tilt of the instrument with respect to the earth gravitation field provide a comparably high tilt range. However, the required degree of accuracy of leveling for applications—e.g. in a range of arc seconds or even below—is therein higher than a simple MEMS accelerometer or inertial measurement unit (IMU) can provide off the shelf.

Inclination measurements with accelerometers in particular tend to suffer from instability and measurement errors, many of which are also dependent on environmental conditions and/or vary over time. In particular, the measurement values of accelerometers also tend to drift over time, often in an order of magnitude which is inacceptable for precise geodetic measurements. Besides a bias drift, also an instability of the scaling factors of the measurements, in particular the absolute or the relative scaling factors of multiple accelerometer axes, can reduce the accuracy. There are calibration approaches known to reduce those effects, like for example proposed in "High-Precision Calibration of a Three-Axis Accelerometer", Freescale Semiconductor, Application Note AN4399, October 2015. But even such an exact factory calibration by a sensitivity-matrix and a bias in a rate table, which is derived from measurements in a plurality of different (preferably well known) static poses of the accelerometer in the gravity-field tends to be insufficient to reliably fulfill the requirements for a high accuracy surveying instrument such as a geodetic surveying device. To achieve highest accuracy, in particular at a large range, there is a need there is a need to determine the parameters of the acceleration sensor and/or the instrument in the current situation and environment. Hence, to achieve highest accuracy with such devices, some kind of field-calibration is required. Hence, to achieve highest accuracy with such devices, some kind of field-calibration is required.

EP 3812701 A1 discloses an online or in-the-field calibration of a geodetic surveying instrument, however, this relies on that some calibration parameters are determined during a factory calibration step resp. not the full set of calibration parameters can be calibrated in the field. U.S. Pat. No. 9,194,698 mentions a static, two axis compensation method in a surveying instrument that has an IMU or accelerometer in the sighting telescope. Thus however, the telescope cannot be used for measurements while calibrating the accelerometer element, which, as already said, needs to be done from time to time. The surveying workflow is interrupted and the user loses time for calibrating. As another drawback, in some instruments the telescope/elevation axis consists only of a mirror and is unable to carry any sensors. Some other instruments, e.g. rotating lasers or profilers, do not possess a second movement axis (elevation axis) at all. Furthermore, e.g. in case of a laser scanner, the second axis is configured to rotate at high spinning or rotation velocity, which makes the calibration more complicated or even impossible, e.g. as the accelerometer can get saturated due to centrifugal force.

SUMMARY

It is therefore an object to improve a surveying instrument, in particular with respect to its leveling—respectively a method for deriving a leveling of a surveying instrument reference frame, in particular to provide measurements which are referenced to level or to a direction of gravity.

Preferably also requirements of the physical leveling at instrument setup should be reduced, e.g. allowing a tilted setup within a range that is larger than in prior art, whereby for example effort and time for the instrument setup can be reduced.

The disclosure relates to a surveying instrument, for example being configured to direct a measurement light beam into a desired measurement direction in space, for example a theodolite, total-station, rotating laser, layout-tool, laser-tracker or laser scanner. The surveying instrument comprises at least one rotational movement axis, for example an azimuth or standing axis, which is for providing a positioning of the targeting direction of the surveying instrument. The instrument further comprises a rotational position encoder configured for deriving a rotational direction value around the movement axis which also represents a measurement value of the targeting direction of the surveying instrument.

The instrument also comprises an acceleration sensor, preferably a MEMS-accelerometer, for deriving a leveling for surveying instrument resp. the measurement value. The acceleration sensor is rotatable around the rotational movement axis in different rotational positions, e.g. in course of the positioning of the targeting direction.

Above that, the instruments comprises a mechanism designed to move the acceleration sensor from a first orientation to at least a second orientation (relative to the rotational movement axis), whereby the second orientation is different from the first orientation. The mechanism is designed and arranged in such a way that the targeting direction is uninfluenced by a movement of the acceleration sensor by the mechanism.

The instrument comprises an evaluation unit, too, configured to derive a calibrated leveling of the instrument from rotational position encoder readings (rotational direction values) in at least a first and a different, second rotational position of the acceleration sensor around the movement axis and readings of the acceleration sensor in the first orientation and in the second orientation.

Said otherwise, the instrument has an accelerometer which can be rotated about a (first) rotational movement axis in at least two different orientations. The two orientations differ to each other by a degree of typically at least 1°, preferably have a difference between 15° and 45°, of at least one of the three angle of orientation and are provided by a distinct mechanism. For calibrating or calibrated leveling estimating, the evaluation unit uses at least two different rotational positions about the first axis and the two different orientations, e.g. a first rotational position with first accelerometer's orientation and a second rotational position with second accelerometer's orientation. Or in other words, at least a first position encoder reading and an associated accelerometer reading in the first orientation and at least a second position encoder reading and an associated accelerometer reading in the second orientation (or the other way round) are used.

However instead of only two different rotational positions, a multitude or range of first rotational positions can be used, such as a movement profile, e.g. by a continuous rotation during a surveying movement or a number of rotation position steps. Thereby for instance, accelerometer readings are taken when the accelerometer is in first orientation within a part of the movement profile and further accelerometer readings are taken when the accelerometer is in second orientation for another part of the movement.

Thereby, the mechanism or the different orientations do not influence the targeting or surveying direction; the measurement direction and the accelerometer orientations are decoupled or independent from each other, which allows for instance for using a movement of the measuring direction in course of a surveying as said rotational movement, for example a rotation of the a laser scanner's turret about the azimuth axis while scanning.

As an option, the first and the second orientation are well-defined by design of the mechanism, for example by precise mechanical stops. As a further option, a difference between both orientations, e.g. in form of a tilting angle, is measured by a factory calibration and stored and thus well-known and/or is correctable by a stored compensation model, e.g. comprising temperature compensation.

Alternatively or additionally, the instrument comprises a measuring unit, e.g. an angular encoder, for measuring actual values representing the first and the second orientation.

In some embodiments, the mechanism is designed to provide exactly two different orientations. In alternative embodiments, the mechanism is designed to provide more than two orientations, preferably enabling a stepwise or continuous range of different orientations, in particular by 360°-rotation of the accelerometer. The range can be quasi-continuous or continuous.

The mechanism comprises as an option a shaft for moving the accelerometer from the first to the second orientation by rotation of the shaft. Additionally or alternatively, the first and second orientation are provided by a first and a second limit stop of the mechanism, in particular tilt stops of a seesaw or of a tipper.

In some embodiments of the instrument, the accelerometer is part of an inertial measurement unit, the mechanism designed to move the inertial measurement unit from a first orientation relative to the rotational movement axis in at least a second orientation and the derivation of the calibrated leveling comprises determination of a calibration parameter of the inertial measurement unit and/or a kinematic parameter of the device.

The present disclosure also relates to a method for determining a calibrated leveling of a surveying instrument having an acceleration sensor. The method comprises a moving of the acceleration sensor around a rotational movement axis (also denoted first axis) of the instrument, the accelerometer being or posing in a first orientation and in a second orientation of the acceleration sensor at different rotational positions with respect to the movement axis, the second orientation being different from the first orientation, whereby a targeting direction of the surveying instrument is independent of the accelerometer's orientation.

The method further comprises acquiring of at least a first and a different, second rotational position reading of the moving by a rotational position encoder for the rotation axis, and sensing of a respective acceleration in the first and in the second orientation, in particular due to dynamics of the moving, by the acceleration sensor as accelerometer readings, in particular and while the moving, and thereof, deriving the calibrated leveling of the instrument from the first and the second rotational position readings and the accelerometer readings. Thereby, the calibrated leveling can be derived directly as a solution of a (global) estimation problem and/or indirectly by applying at least one calibration parameter, determined from said rotational position readings and accelerometer readings to accelerometer readings. Such an optional calibration parameter determination can further include determination of kinematic parameters such as accelerometer position from said readings in the different orientations.

Optionally, the method comprises a surveying, e.g. a scanning, in parallel to the determining of the calibrated leveling, in particular whereby the angular speed and/or an angular extent of at least a portion of the moving is determined by a measurement parameter of the surveying, i.e. a moving about the rotation axis determined by a surveying is used for acquiring the different rotational positions needed for the derivation of a calibrated leveling. Or seen the other way round, the calibration method can be executed simultaneously to a measurement of an object as they do not interfere with each other, whereby "parallel" or "simultaneous" does not mean that measurement and calibration have to be of same length in time but that one process is executed while the other process is running.

As an option, the moving comprises at least a portion of constant angular speed and/or a first and a second portion of rotational movements of different angular speeds, whereby the accelerometer is provided in both orientations in each moving portion, based on which the calibration leveling is derived. As a further option, the first and the second moving portion sum up to at least a 180°-rotation, in particular form a 360°-rotation or a multiple of a 360°-rotation. As another option, there is an evaluating of a centrifugal acceleration during those portions in the deriving of the calibrated leveling.

In further developments of the method, the acceleration sensor is, for example continuously, moved multiple times from the first to the second orientation and back during the moving resp. in a same rotational position with respect to the first rotational axis.

As another option, there is a determining of an (rough) orientation of the rotational movement axis (tilt or inclination) and choosing at least one of, preferably both the first and second orientation of the accelerometer dependent on the determined orientation of the rotational movement axis. If for example the instrument has a tilt of 15°, accelerometer orientations of 0° and 30° would mean calibration angles/rotations axis values of −15° and +15° and thus same movement trajectories which in some cases, e.g. in embodiments with a rotation mechanism for orientation change of the accelerometer, would not allow for a full calibrated leveling or an update of all leveling parameters. In such a case, for example the second accelerometer orientation can be chosen or altered to e.g. 40° in this option, preferably automatically.

The first and second orientation are optionally well-known and/or well-defined with respect to the rotational movement axis, e.g. by mechanical design and/or measurement of a respective accelerometer orientation.

An embodiment of the disclosure also relates to an according system providing the method, e.g. embodied as a computation unit. Such a device or system can comprise microcontrollers, microcomputers, DSPs or a programmable or hardwired digital logics, etc., wherefore the present disclosure can involve or be embodied as a computer program product with program code being stored on a machine readable medium or embodied as an electromagnetic wave (such as e.g. a wired or wireless data signal to be provided to the instrument, or a program stored at a remote (cloud-) computation unit linked to the instrument), which implements functionality at least partially in software—which therefore is also an embodiment.

The inventive surveying instrument with its mechanism for changing the accelerometer's orientation allows an online or in-the-field determination of a calibrated leveling or calibration or check of leveling acquisition or leveling parameters at given environmental conditions, thus allowing higher accuracy with an acceleration sensor, in particular a MEMS accelerometer, over a large tilt range. The instrument is less sensitive to parameter variations of the accelerometer and/or the instrument itself over life time and at different environmental conditions than previous surveying instruments. Thereby as an option, the method comprises a check of one or more of such calibration parameter by deriving or estimating the parameter from the first and the second rotational position readings and the acceleration sensor readings and verifying if the calibration parameter is within a defined tolerance. In case the parameter is not within the accepted tolerance value, a notification can be outputted to a user, e.g. a service note.

Thereby, the mechanism is independent of instrument structures needed for a measurement task and can for example be used for orientation change of the accelerometer for leveling calibration/verification while scanning, therewith enabling for example to determine or monitor tilt changes while scanning. A MEMS sensor is not saturated while scanning due to its stand-alone mounting mechanism while there is large flexibility to position the accelerometer in the instrument, in particular compared to scanning instruments of the state of the art where the accelerometer is placed on the second rotating axis, i.e. fast axis. As the accelerometer can easily be integrated in the instrument, no wireless sensor connection is needed. In sum this means also less effort in production and service and no factory or qualified service calibration is needed.

The present instrument advantageously enables a large tilt range, even possibly any tilt, at highest accuracy under manifold environmental conditions and high tilt change monitoring capabilities. An operator does not need to level the instrument due to the large and highly accurate tilt range.

BRIEF DESCRIPTION OF THE DRAWINGS

Devices, methods, systems, setups and computer programs are described or explained in more detail below, purely by way of example, with reference to working examples shown schematically in the drawing.

Specifically,

FIG. 4 shows schematically a further example of a mechanism for providing two different orientations of the surveying instrument's accelerometer;

FIGS. 5*a-c* show schematically another example of a mechanism for change of orientation of the accelerometer;

FIG. 6 shows schematically another example of a mechanism for change of orientation of the accelerometer;

FIG. 7 shows schematically another example of a mechanism for change of orientation of the accelerometer;

FIGS. 8*a,b* show schematically another example of a mechanism for change of orientation of the accelerometer;

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplary shown. The terms "substantially" is used to express that a feature can, but in general is not required to be realized exactly up to 100%, but only in such a way that a similar or equal technical effect can be achieved. In particular slight deviation, due to technology, manufacturing, constructional considerations, etc. can occur, while still within the meaning of the scope.

Figure 1A:
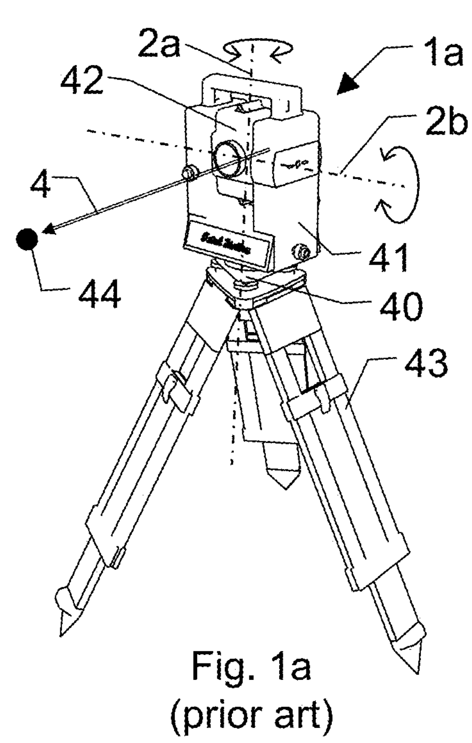
FIGS. 1*a,b* show examples of a surveying instrument as known in the art.

FIGS. 1*a,b* show examples of an embodiment of a geodetic surveying instrument 1 as known in the art configured as a theodolite or total station 1*a*. In the shown example, the instrument 1 is stationed with its instrument base 40 on a tripod 43. It comprises a horizontal movement axis 2*a* around which an upper portion (or turret) 41 of the instrument can be moved with respect to the instrument base 40. The upper part comprises a vertical movement axis 2*b* around which a telescope and/or distance measurement unit 42 can be moved. By this arrangement, a measurement light beam of the distance measurement unit can be aimed to a desired target point 44 in a measurement direction 4. The Instrument therein comprises a rotational instrument encoder at each of the movement axes 2*a*,2*b* to derive a measurement value of an orientation of the measurement direction 4 with respect to the base 40, as well as a value of a distance information from the instrument 1 to the target point 44, whereby 3D spatial coordinates of the target point 44 can be derived and provided by the surveying instrument 1 as a measurement value. Those rotational encoders provide angular measurement values of the orientation of the measurement direction 4, respectively the instruments movement axes 2*a*,2*b* in a high resolution, e.g. in the range arc seconds or below. Such requires rather sophisticated rotational encoders, with advanced measurement evaluation units, which can e.g. also comprise error compensations for eccentricity, temperature drifts, encoder code errors, misalignment of encoder sensors, etc. The encoders—respectively their readout unit—can therein require some initial movement as a calibration move or movement sequence to derive or check calibration values for their angular measurements to fully achieve their specified accuracy. The movement axis 2*a* and 2*b* of the instrument 1 are therein preferably motorized for providing a precise spatial positioning of the measurement direction 4 in space, which can also be remote controlled and/or automated.

Figure 1B:
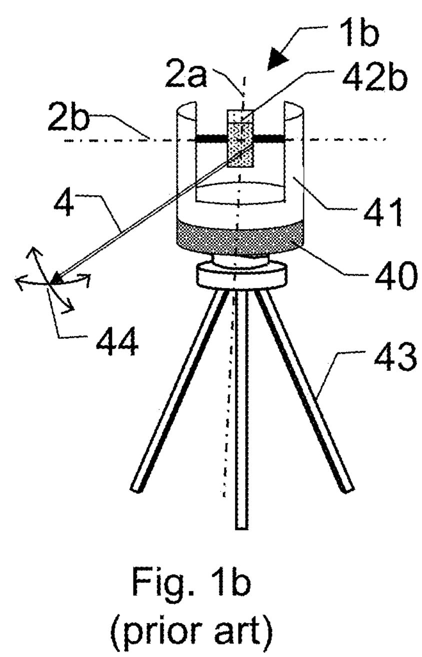

FIG. 1*b* shows another example of an embodiment of a geodetic surveying instrument 1 configured as a Laser scanner 1*b*. As a laser scanner 1*b* is configured to derive a point cloud with many 3D measurement points 44, it is designed to provide a fast movement of the measurement direction 4 in space during the scanning for a fast successive measurement of many target points 44 in a defined spatial region or in a substantially full-dome range. Such can be achieved by not moving the whole distance measurement unit 42 in at least one of the movement axes 2*b*, but to move a less inert deflection element 42*b*, such as a deflection mirror for the measurement light. The movement axes 2*a* and 2*b* of the instrument 1*b* are therein motorized to provide a precise two-axis spatial positioning of the measurement direction 4 in space and a smooth constant scanning speed.

The present disclosure is therein preferably applied to the slow axis 2*a*, which is moving the top-portion 41 with respect to the instrument base 40 and stationing-unit 43.

Another, here not shown embodiment of a geodetic instrument would be a Laser-Tracker as known in the art or a rotating laser, a Layout-Tool or a building/construction theodolite.

Figure 2A:
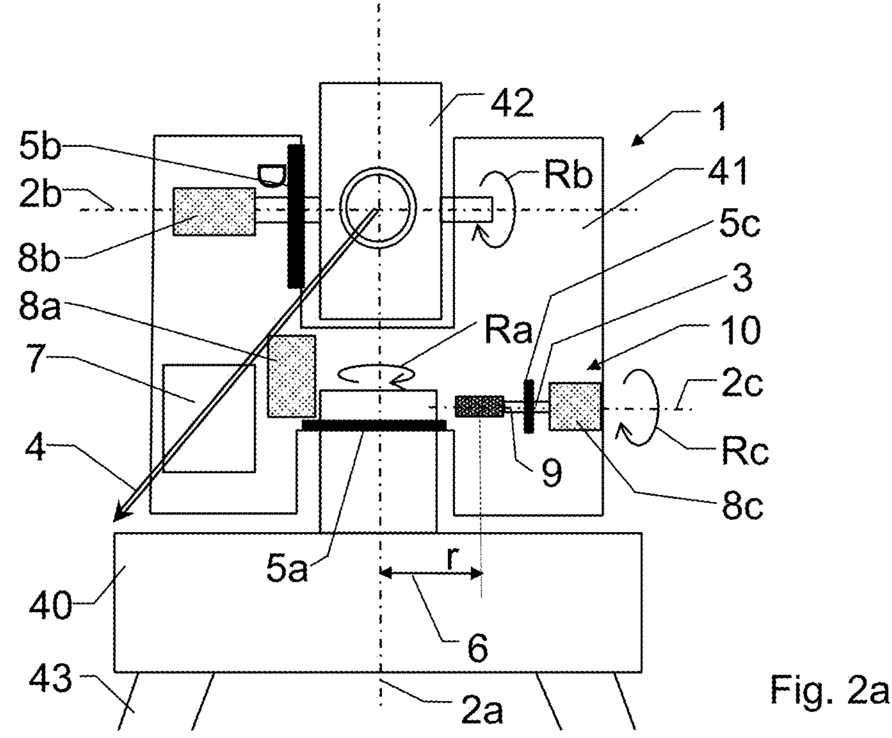
FIGS. 2*a-c* show an example of a setup of an embodiment with a first example of an accelerometer position/orientation change mechanism for a surveying instrument with an integrated accelerometer.

Summarized, such a geodetic surveying instrument 1 in terms can e.g. be configured with at least one, preferably two, movement axes, in particular with a vertical, azimuth or standing axis 2*a* and a substantially orthogonal, e.g. horizontal axis 2*b* (or trunnion axis), which axes 2*a*,2*b* are configured to aim a target axis or measurement direction 4 by one or two axis-positioning to a measurement target 44, for example as illustrated in FIGS. 2*a,b*.

FIGS. 2*a,b,c* illustrate that the target axis or measurement direction 4 of the surveying instrument 1 can e.g. be configured with an opto-electronic distance meter and/or a (optical and/or electronic) telescope. For example, a laser distance meter preferably arranged substantially coaxially with a line of sight of a visual aiming unit, as symbolized by the upper portion 42. The movement axes 2*a*, 2*b* are each configured with a rotational or angle encoder 5*a*, 5*b* to measure an actual orientation of the movement with geodetic accuracy, e.g. with an angular resolution some arc-seconds or preferably below. By the instruments rotational position encoders 5*a*,5*b* and the distance meter, polar coordinates of a measurement target can be derived. The standing or azimuth axis 2*a*—as a first of the movement axes 2*a*, 2*b*—is configured to rotate (indicated by arrow Ra) the turret 41 with respect to a base 40, by which base 40 the instrument 1 can be stationed e.g. substantially horizontal on a tripod 43. The tilting axis 2*b*—as a second of the movement axis 2*a*, 2*b*—is comprised in the turret structure 41 and rotates (arrow Rb) the aiming unit 42 with the distance measuring target axis 4. The movement axes 2*a*,2*b* are driven by an electrical motor drive 8*a*,8*b*, or in some embodiments optionally also by hand.

For most measurements by a surveying instrument 1, a reference of the measurement values with respect to level or plumb line is required. Such a reference can be established by a precise mechanical leveling of the surveying instrument 1 during setup and/or by a measurement and numerical consideration of possible inclinations with respect to level. As high-accuracy inclination measurement sensors (like oil pot sensors, etc.) tend to have a comparably small measurement range in which precise measurements can be established, it is a common approach to combine a mechanical leveling of the instrument base 40 at setup, followed by a measurement of residual inclination errors by a level sensor—for mechanical fine-leveling and/or for numerical compensation of the measurement results.

To achieve the required leveling accuracies for surveying instruments in the field, Microelectromechanical system (MEMS) accelerometers 9 are known. The acceleration sensor or accelerometer 9 is a device that measures proper acceleration. Proper acceleration, being the acceleration (or rate of change of velocity) of a body in its own instantaneous rest frame, is not necessarily the same as coordinate acceleration, being the acceleration in a fixed coordinate system. Conceptually, the acceleration sensing element 9 can e.g. behave as a damped mass on a spring, as most of the commercially available accelerometers 9 do. The accelerometer is therein preferably embodied as a MEMS device, which for example, can substantially comprise a cantilever beam with a proof mass, which is also known as seismic mass, and some measurement arrangement to derive a deflection of the mass or cantilever, e.g. a piezo, resistive, capacitive or optical sensor. In some embodiments, besides a direct measurement of a deflection value, also a compensation measurement approach can be used. But in other embodiments, also accelerometers based on other principles can be used, e.g. thermal accelerometers or others.

Figure 2B:
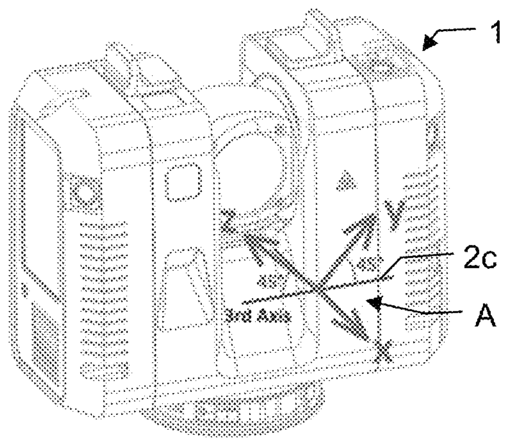

However, MEMS accelerometers on their own are of too low accuracy and/or measurement stability. In particular, there are drifts, bias- and scaling errors in the measurement values of the accelerometers. Those errors also vary over time and dependent on environmental conditions (such as temperature, humidity, air pressure, etc.). Even with the vendor-proposed calibration approaches, those problems cannot be sufficiently overcome to guarantee the required accuracy, in particular over time.

an accelerometer 9 is located in a rotating portion 41 of the instrument 1. The accelerometer 9 can be in principle positioned anywhere in the instrument 1, with the accelerometer axes A for example oriented as depicted in FIG. 2*b*, with internal y-axis and z-axis with a 45° angle to a third, rotary axis 2*c* (as explained below) and the x-axis perpendicular to this rotary axis 2*c*.

The accelerometer 9 is attached to a mechanism 10 which can move it from a first orientation O1 to at least a second orientation O2 that is different from the first one, whereby the difference in orientation is preferably at least 1° of one of the three rotational angles, for instance between 15° and 45°. In the example, the mechanism 10 comprises a motor drive 8*c* and a shaft 3 by which the accelerometer 9 can be rotated (arrow Rc) about an axis 2*c*, an additional or third axis in view of the other axes 2*a*,2*b* which are independent of this third axis 2*c*. Accordingly, the targeting axis 4 is set by rotations Ra, Rb about first and second axes 2*a*,2*b* but it is uninfluenced by rotation Rc about third axis 2*c* resp. by change of orientation of the accelerometer 9 by separate mechanism 10, completely independent of telescope 42 or the elevation axis 2*b*. Or seen otherwise, a movement of telescope 42 does not change the position or orientation of accelerometer 9 at all and also a movement of the turret structure 41 does not influence the position or orientation of the accelerometer 9 within the instrument 1 but a change of the accelerometer's orientation is provided by the distinct mechanism 10.

The relative difference between the first orientation O1 and the second orientation O2 is well defined and/or well known, wherefore in the example the rotational axis 2*c* is configured with a rotational encoder 5*c* which measures the rotational position of shaft 3 resp. of the accelerometer 9 and therewith its orientation O1 or O2 resp. a difference between different orientations O1, O2.

A calibration or evaluation unit 7 which is configured to derive a calibration and/or a leveling value, is configured and arranged to derive acceleration value readings for the accelerometer 9 in the first orientation O1 and in the second orientation O2 and also angular value readings from the encoder 5*a* in both accelerometer orientations O1, O2. From said readings, a calibrated leveling is derived, e.g. by averaging values at different speeds, accelerations and/or positions or by using the readings as input for a accelerometer model and calculating a mathematical/statistical estimator or a least square solution for the modelled instrument's leveling. Thereby one or more calibration parameters can be determined, for instance a time delay offset of the accelerometer readings with respect to a movement profile, a scaling factor, a bias offset and/or a sensitivity matrix of the accelerometer readings and/or a kinematic parameter such as a position of the accelerometer.

Hence, the evaluation unit 7 is configured to provide at least a calibrated tilt value of the instrument 1 to the measurement unit which is processing and providing the spatial measurement results of the instrument 1 for storage and/or further usage. The evaluation unit 7 is preferably located at or in the body of the instrument 1 as depicted, but can in another embodiment also be provided remote with a wired or wireless data link to the instrument 1, e.g. at a remote instrument controller or at a cloud or fog computation system. The evaluation unit 7 comprises computational electronics—such as a microprocessor, microcontroller, digital signal processor, programmable and/or hardcoded circuits and logics, etc.

Figure 2C:
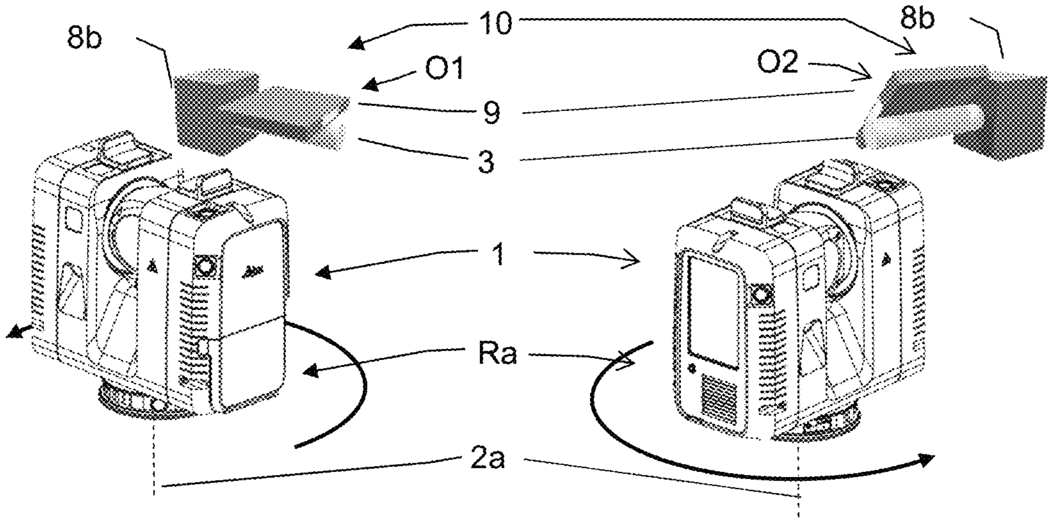

For example as depicted in FIG. 2*c*, the instrument 10 is continuously rotating about azimuth axis 2*a* whilst determining a movement profile with respect to axis 2*a* with the angle encoder 5*a* whereby in the first half-circle the accelerometer 9 is positioned/fixed by mechanism 10 in the first orientation O1 and in the second half-circle it is positioned/fixed in the second orientation O2, e.g. with a measured difference of 30° to the first orientation.

Advantageously, the rotation Ra can be part of a surveying process, e.g. a scanning movement of the instrument 1 during which said accelerometer readings resp. the calibration measurements are done. Hence, the calibration procedure can be done in parallel to a measurement of an object with the instrument 1, therewith reducing or possibly avoiding additional time effort for calibration. Another example for a calibration movement which can be done in parallel to a measurement task of the instrument 1 is given in following FIG. 3.

Figure 3A:
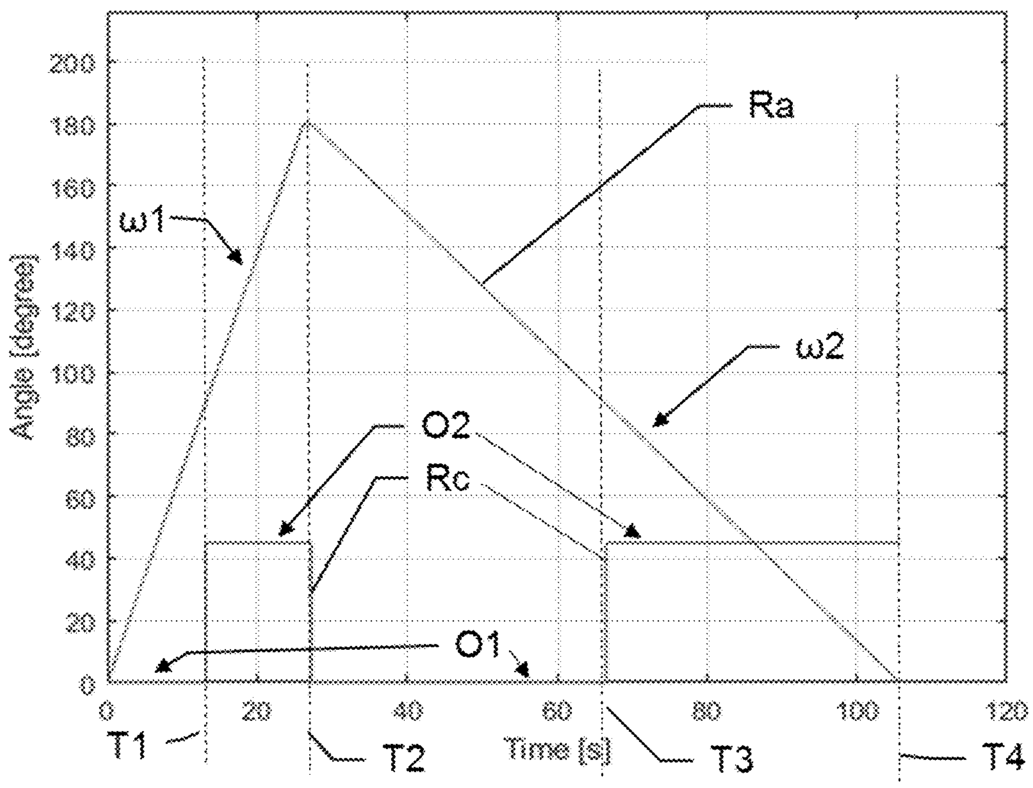
FIGS. 3*a-c* show schematic examples of calibration movement profiles with the accelerometer being positioned in a first and in a second orientation.
Figure 3B:
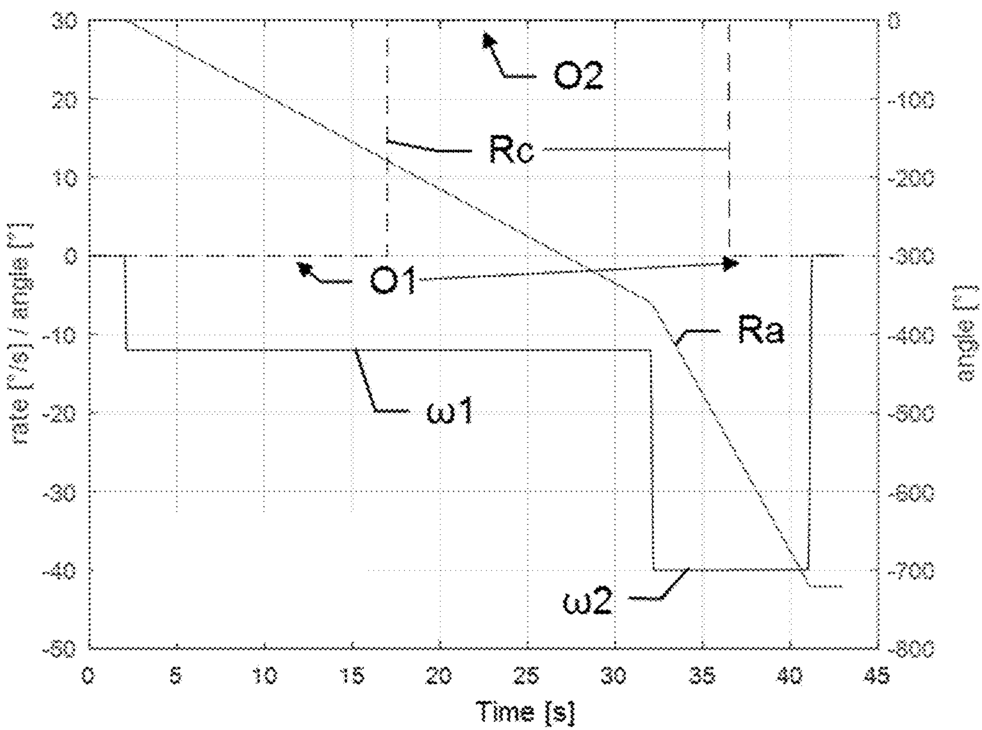
Figure 3C:
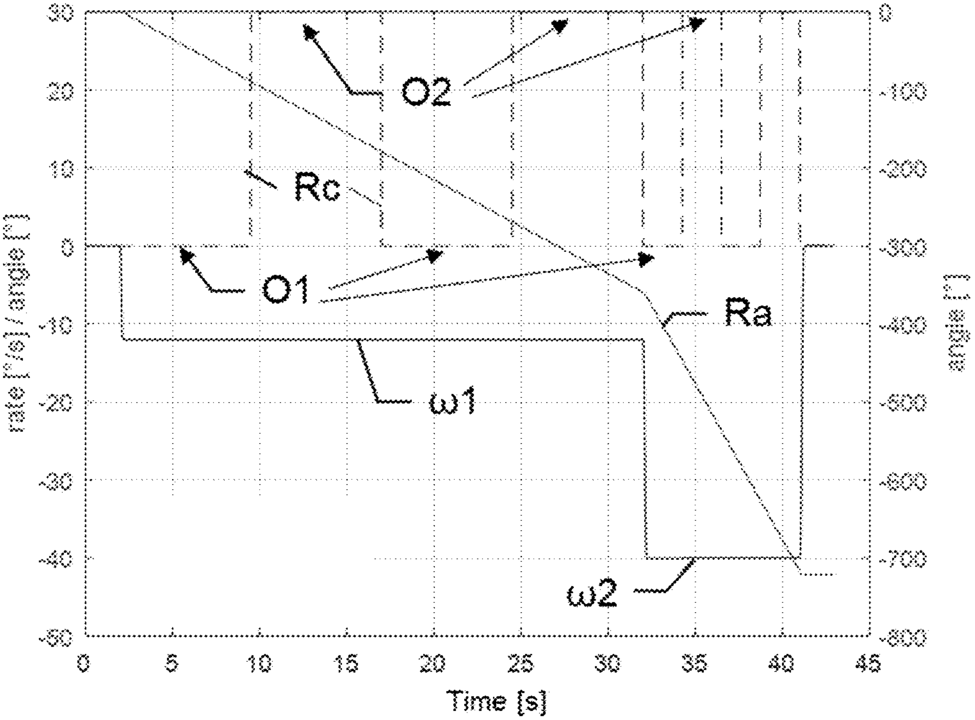

FIGS. 3*a-c* show schematic examples of a calibration movement profiles with the accelerometer being positioned in first and in second orientations O1, O2.

In the example depicted in FIG. 3*a*, the accelerometer is positioned at the start of rotation Ra about the azimuth axis in orientation O1. The rotation Ra is for example done with a commanding of a desired movement profile to a motorized drive mechanism of the instrument (e.g. drive 8*a* in FIG. 2*a*) for rotating the rotational axis of the instrument and starts with an angular velocity ω1 and is for example intended to change the measurement direction of the instrument to point at or scan a specific target. At a time T1, the mechanism changes the accelerometer's orientation to the second orientation O2, e.g. in case of a rotational mechanism as depicted in FIG. 2*a* by a rotation Rc, whilst further rotating about the azimuth axis with constant speed ω1.

At a later time T2, the rotation Ra is reversed, e.g. for going back to the instrument's initial position ("homing") or for scanning with a slower angular speed ω2. At the same time T2, the accelerometer's orientation is changed back by the independent mechanism. At a time T3 resp. at some rotational position of the azimuth axis, whilst still rotating with speed ω2, the accelerometer again is flipped to orientation O2 where it remains until the rotational movement ends at a time T4.

The calibrated leveling is derived from the encoder readings of the rotation Ra in combination with the accelerometer readings for both angular rates ω1 and ω2 and both orientations O1 and O2, e.g. by the least square solution of the calibration model.

For an improved calibrated leveling or for a full calibration resp. for determination of all calibration parameters, for example amongst others to average out imperfections of the bearing, preferably a full 360°-rotation or a multiple thereof, e.g. a 720° rotation for different angular speeds ω1 and ω2 is used with at least two orientations O1, O2 as shown in FIGS. 3*b* and 3*c*.

FIG. 3*b* illustrates a rotation Ra about the azimuth axis with first angular speed or angular rate ω1 whilst the acceleration sensor is in its first orientation O1 at the start. After some time during rotation with first angular speed ω1, the orientation is changed by rotation Rc to second orientation O2, in the example by altering the accelerometer's tilt by 30°. Later, the angular speed is changed to second speed ω2 whilst at first keeping the accelerometer in the second orientation O1 and after some time changing back to first orientation O1. The process is stopped after two full rotations Ra about the azimuth axis.

FIG. 3*c* shows an example with a higher number of orientation changes compared to the example of FIG. 3*b*. Now, eight changes of orientation O1, O2 (in the example again differing by 30°) for two full rotations Ra take place. More generally spoken, while rotating, the mechanism moves the accelerometer from one position to the other where it stays for a few seconds each, with at least two position changes for each speed ω1, ω2 or each full rotation.

Sensor values may only be considered in movement sections with a constant rotational speed (with Euler-force=0), for example by ignoring measurement values during angular acceleration or deceleration. In each of those constant speed movement sections, the centrifugal acceleration is constant and its result is sensed by the accelerometer and can also be calculated in knowledge of speed and distance r. However, the angular speeds ω2 need not to be constant, any speed is possible including accelerations, e.g. fully dynamic trajectories, even of random shape can be used to establish a calibration of the accelerometer. In case of considering non-constant speed phases as well, in addition to the centrifugal acceleration, also the Euler-acceleration is taken into account in the calibration considerations, which is in proportion to the angular acceleration of the movement trajectory. Such could e.g. also enable to establish a calibration when the azimuth axis is moved by hand and not by a motor, or e.g. enable a calibration or re-calibration during random dynamic movement trajectories during a measurement process, (without the need to enforce constant speed phases of the movements during surveying measurements—which would be another option for a calibration during measurement). Since the Euler-acceleration is in different direction than the centrifugal one, it can also bring additional advantages in the calibration parameter calculations, e.g. as the accelerations are evaluated in two (with gravity even three) directions.

More than two different speeds of the azimuthal rotation, more than one or two full rotations and/or more than two different orientations can be used, e.g. in view of averaging residual errors.

On the other hand, if some parameters are considered stable and/or less accuracy is needed, the workflow can be reduced, e.g. a "quick calibration" or status check/verification compared to a "full calibration" which is for example due regularly in longer time intervals or after severe influences on the instrument such as high temperature changes or mechanical impact. Such a "quick" or "intermediate" calibration movement comprises for instance one azimuthal rotation only with two orientations O1, O2 or vice versa. Another option to determine some parameter would be a "static" procedure whereby for example the first axis of rotation moves to different angular positions and while standing still, the accelerometer is sampled for both orientations O1, O2.

FIG. 4 shows schematically a further example of a mechanism 10 for providing two different orientations of the surveying instrument's accelerometer 9. In the example, the mechanism is embodied as a seesaw 60 with two well defined limit stops S1, S2. When the seesaw 60 is tilted about axis 2*c* at the first stop S1 as depicted, the accelerometer 9 is in its first orientation O1. When the seesaw 60 is tilted at the second stop S2, the accelerometer 9 is in its second orientation. By the well defined mechanical stops S1, S2 resp. the tilt difference provided therewith, the difference in accelerometer orientation is well defined. The relative angle between the two stops S1 and S2 is e.g. determined during production of the instrument at very high accuracy and thus well known and for instance stored in a memory of the instrument. These at least two angular positions are repeatable in the order of e.g. a few arcseconds, whereby as an option they can be corrected by a stored compensation model, e.g. for temperature compensation. As another option, the relative angle change can be measured by some measuring means, e.g. an optical angular encoder attached to the third rotation axis 2*c*. Thereby, the relative angle between the two stops and therewith the difference in orientation of the sensor 9 is for example 20°, 30°, 40° or 50°, but may also be greater, e.g. more than 90° or even 180°.

The change of tilt and therewith orientation is in the example enabled by magnetic force, e.g. a permanent magnet 62 attached to the seesaw 60 and an electromagnet 61 positioned beneath. As an alternative, for instance a piezo actuator based on the piezo effect can be used. An actuator can for example comprise springs, too.

FIGS. 5*a*-*c* show schematically another example of a seesaw-like mechanism 10 for tilt change of the accelerometer 9 about independent axis 2*c*. FIG. 5*a* is a 3D-view, FIG. 5*b* a longitudinal section and FIG. 5*c* a cross section. The mechanism 10 comprises two braced and glued ball bearings 63 and 64, with the body 60 of the seesaw attached to in between. By an electromagnet or coil 61 as actuator, the seesaw can be tilted between two well-defined limit stops S1 and S2, thereby changing the orientation of the MEMS acceleration pick-up 9 and providing two well-defined orientations of the accelerometer 9 (in the figures, the accelerometer 9 is shown in a rest position).

FIG. 6 depicts in a 3D-view schematically another example of an orientation change mechanism 10. In this example, the accelerometer 9 is attached to an end of an angled plate 70. The other end of plate 70 is attached to a rotary drive 8*c*, e.g. a DC or stepper motor, by a shaft 3. By rotation Rc of shaft 3 and therewith plate 70, the position of the accelerometer 9 can be changed from a first stable orientation O1 to a second stable orientation O2, whereby the accelerometer's coordinate frame is rotated, too.

The two positions O1, O2 can be well-defined by stops (not shown in the figure). Alternatively or additionally, the mechanism 10 comprises an angle encoder for measuring a rotary position. In the latter case, the revolving mechanism 10 can as an option provide more than two different well-known positions all along the possible extent of the rotation Rc, therewith enabling more than two well-known accelerometer orientations, for example a range of accurately measurable positions resp. orientations which a user or an algorithm can select.

FIG. 7 shows in a 3D-scheme another revolving or rotation mechanism 10. In this example, a drive 8*c* cam rotate a wedge 72 by a shaft 3, supported in the example by ball bearings 71. On top of the wedge 72, an accelerometer 9 is attached. In this example, the mechanism 10 provides a full or 360°-rotation Rc of the accelerometer 9, allowing for a wide range of possible orientations.

As an option, such an internal axis 2*c* with the accelerometer 9 which can rotate fully by 360° at constant speed, the reference positions/different orientations need not to be well defined or well known. By assuming that the accelerometer axes are rigid during one trajectory phase, the accelerometer readings of a 360°-rotation about internal axis 2*c* describe trajectories on concentric spheres, which defines for each axis a well-defined angle reference scale. The calibration is done over multiple different azimuthal positions or while the azimuthal axis is also rotating (a sphere meridian always corresponds to 360°).

FIGS. 8*a, b* show in a schematic side view another example of a rotary mechanism 10 for orientation change. In the example, the accelerometer 9 is situated on "top" of a plate 91 which is movably connected to axis 2*c* and can be lifted/partly rotated about axis 2*c* by an eccentric 90 "below" plate 91. The eccentric 90 is driven via a shaft 3, e.g. by a step motor (not shown). The exemplary mechanism allows for a range ΔO of different accelerometer orientations whereby the actual orientation can for instance be determined by an angular encoder at axis 2*c* (not shown).

Figure 9:
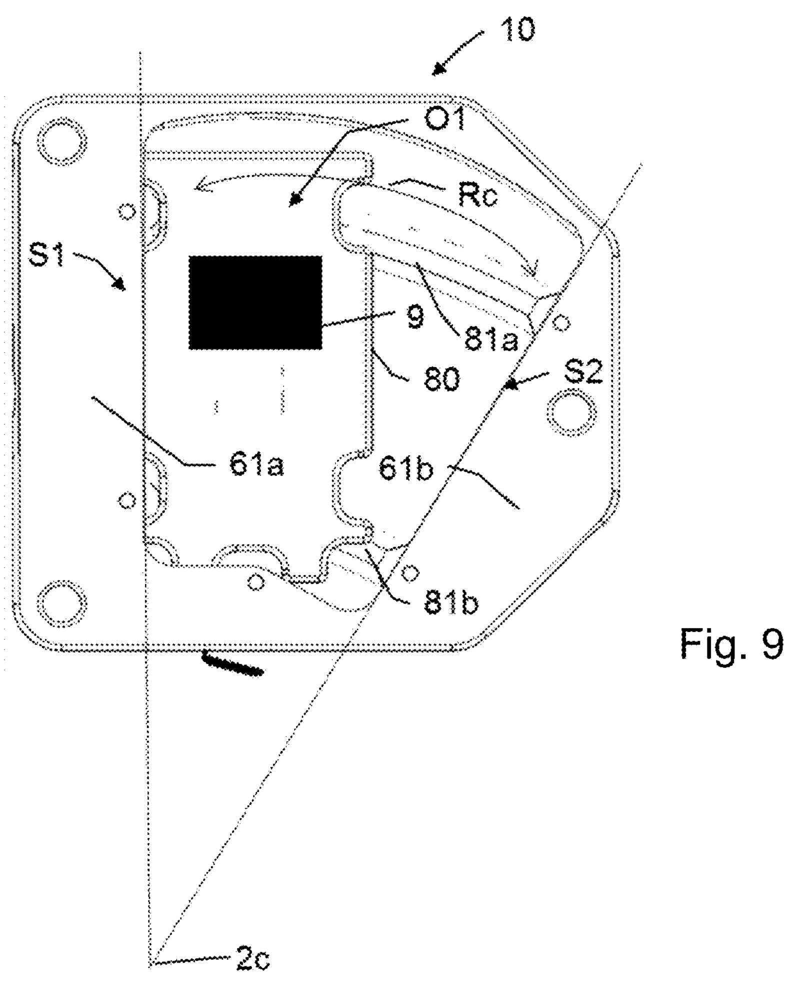
FIG. 9 shows schematically another example of a mechanism for change of orientation of the accelerometer.

FIG. 9 shows in a cross sectional view a schematic embodiment of a tilt mechanism 10 for an accelerometer 9. In this example, the accelerometer 9 is attached to a body 80 of a tipping device, which can flip between two positions or stops S1, S2, e.g. implemented by three points of support an each side, thereby changing the orientation of the accelerometer 9 between a first orientation O1 and a second one. Thereby, the body is actuated in the example by electromagnetic force provided by coils 61*a*, 61*b* at a respective stop S1, S2 and guided by guide rails 81*a*, 81*b* at "top" and "bottom" of carriage 80. The movement of the body 80 resp. of accelerometer 9 can be seen as a rotation Rc about a "virtual" axis 2*c*.

Figure 10:
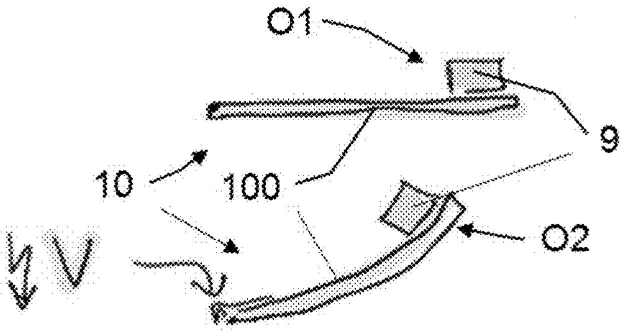
FIG. 10 shows schematically another example of a mechanism for change of orientation of the accelerometer.

FIG. 10 shows in a schematic side view another example of a mechanism 10 without a dedicated axis for orientation change of a surveying instrument's accelerometer. In this embodiment, the accelerometer 9 is attached to a piezo actuator which bends when a voltage V is applied, thereby changing the accelerometer's orientation about a "virtual axis" from a first one O1 to a second one O2.

Figure 11:
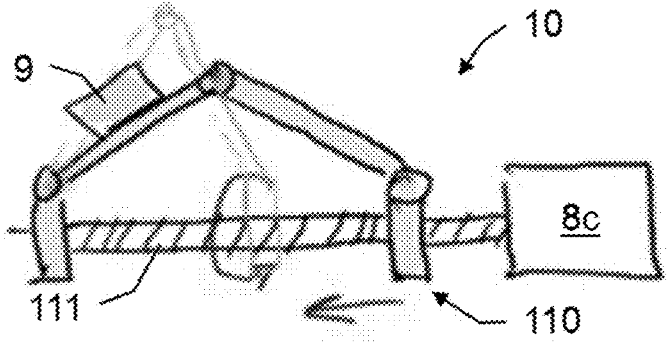
FIG. 11 shows schematically another example of a mechanism for change of orientation of the accelerometer.

FIG. 11 shows in a schematic side view yet another example of a rotary mechanism 10 for orientation change. In this example, the accelerometer 9 is attached to a jack like structure with a screw 111 driven by a motor 8*c*, whereby driving of the screw 111 tilts the accelerometer 9 resp. rotates the accelerometer about a "virtual" axis.

Figure 12:
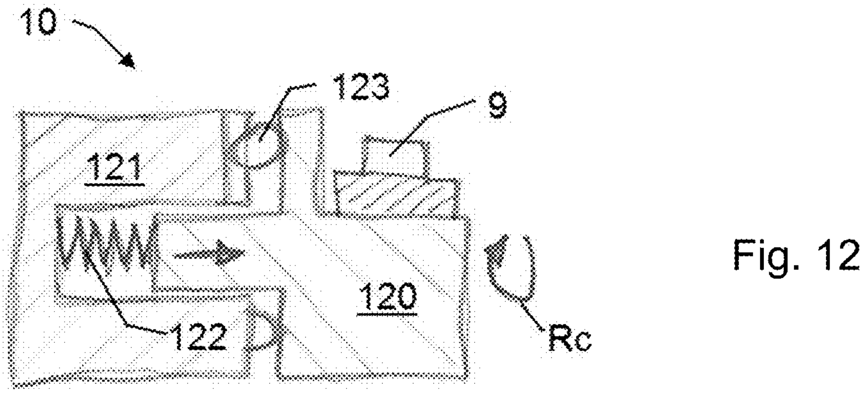
FIG. 12 shows schematically another example of a mechanism for change of orientation of the accelerometer.

FIG. 12 shows in a schematic cross sectional view still another example of a mechanism 10 for orientation change. Here, the accelerometer 9 is attached to a mounting block 120 which has a positive clutch by a tension spring 122 and bearings 123 or a Hirth joggle (not shown) to a holder block 121. By pulling out the mounting block 120, a rotation Rc relative to the holder block 121 can be executed, therewith changing the orientation of accelerometer 9. By this exemplary mechanism 10, multiple distinct accelerometer positions or orientations can be provided.

Figure 13:
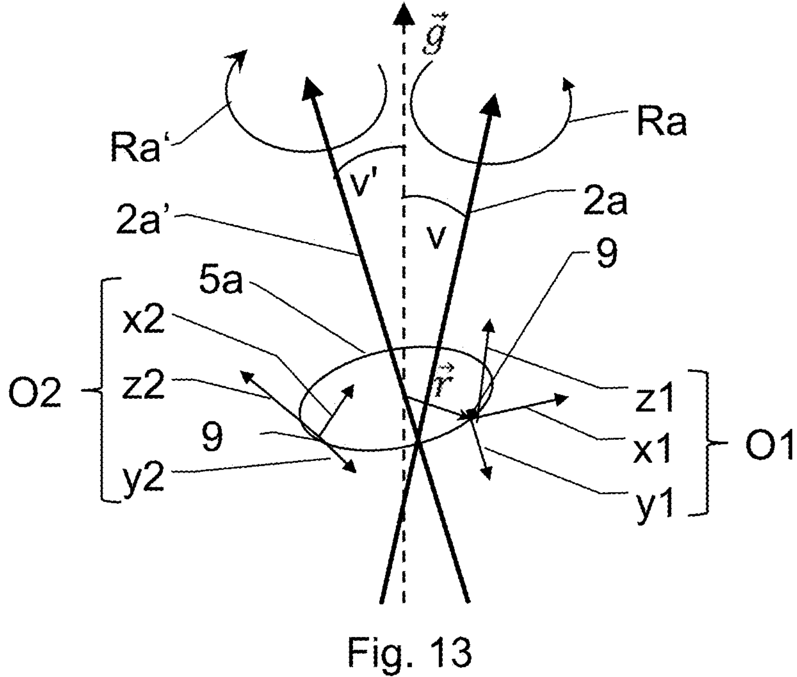
FIG. 13 shows a schematic sketch with respect to the instrument's setup of the rotational axis 2*a*, angular encoder 5*a* and accelerometer.

FIG. 13 illustrates a schematic sketch with respect to the instrument's setup of the rotational axis 2*a*, angular encoder 5*a* and accelerometer 9, and to explain their functionalities.

In this basic structure, an acceleration measurement sensor 9—e.g. a MEMS accelerometer—is arranged to be turned around the rotational axis 2*a* of the instrument and an angle of rotation Ra, Ra' around this axis 2*a* is precisely measured by an angle encoder 5*a*.

The independent mechanism (not indicated in the figure) moves the MEMS device into at least two positions, corresponding to an additional rotational axis 2*a*' which is not parallel to the first axis of rotation 2*a*, where the relative change from the first accelerometer's orientation O1 to the second orientation O2 is known with very high accuracy. Thus, a rotation of the accelerometer 9 in at least two axes 2*a*, 2*a*' is provided which allows to sufficiently calibrate e.g. a Sensitivity-Matrix and Bias of the accelerometer.

The accelerometer 9 has therein in each position a, preferably known or defined and/or fixed, position at $\vec{r}^{\,1}$ 0 from the center of a rotation axis 2*a*, 2*a*' to the accelerometer 9. As it can be seen in the figure, the rotation axes 2*a*, 2*a*' of the instrument are miss-aligned with respect to the direction of gravity $\vec{g}$ by a deviation v, v', which is also referred to as tilt of the instrument. Thereby, the geographic position (gravity) does not need to be known as but can also be estimated.

The example shows an accelerometer 9 with three measurement axes, but the present disclosure can also have an accelerometer with two axes. Theoretically, the basics can also be worked with a single axis accelerometer, but calibration and resulting measurement accuracy can be expected to be higher by using a three axis sensor 9. The actual physical orientation in the first orientation O1 of the axes of the accelerometer 9, denoted x1,y1,z1 in the figure for the first orientation O1, are well-defined and/or well-known as well as in the second orientation O2, with the (same) axes denoted x2,y2,z2 in the figure, respectively the difference of orientation between the first orientation O1 and second orientation O2 is well-defined and/or well-known. In a preferable embodiment, one of the orientations O1, O2 of the accelerometer 9 can be at least substantially aligned orthogonal to the movement axis 2*a* or 2*a*' and/or the reference frame of instrument, e.g. with one accelerometer sensitivity axis in radial direction.

The rotations Ra, Ra' are done with an angular rate or velocity $\omega_z$, which can be derived from the angle encoder 5*a* readings $\varphi$ by $$\omega_z = \frac{d\varphi}{dt},$$

as well as an angular acceleration $$\propto_z = \frac{d^2\varphi}{dt^2}.$$

To derive angular speed and/or angular acceleration from encoder position readings, filtering and/or smoothing algorithms can be applied.

In a special embodiment, also an additional gyroscope can be used in combination with the encoder 5*a* to derive and/or smooth the angular speed and/or acceleration values by a combination of encoder and gyro data. If the instrument comprises such a gyroscope or if the accelerometer 9 is part of an Inertial Measurement Unit (IMU), the multi-orientation resp. multi-axis procedure can also be used to calibrate the gyroscope resp. the IMU.

Figure 14:
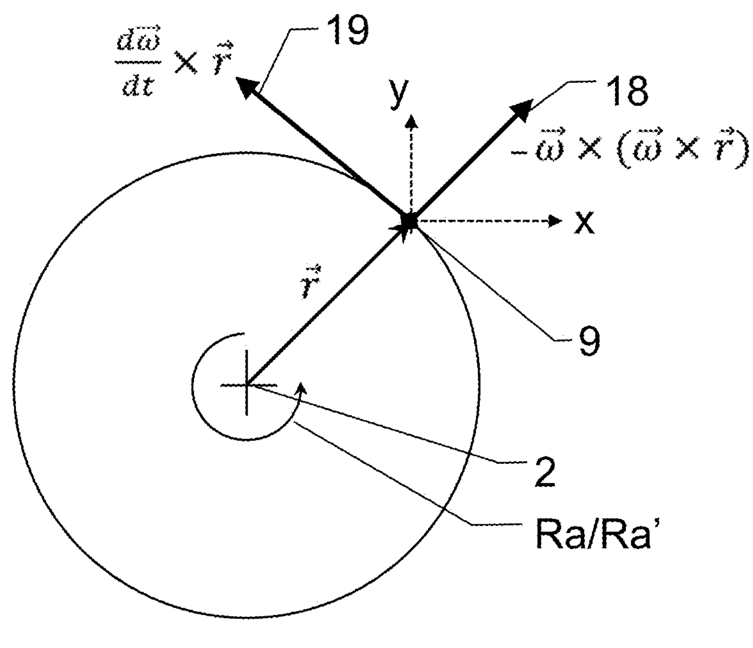
FIG. 14 shows schematically some of the dominant forces which can result during a rotational movement of the accelerometer.

FIG. 14 illustrates schematically some of the dominant forces which can result during a rotational movement Ra or Ra' of the accelerometer 9 as shown before. In addition to the always present acceleration g due to gravity, there are accelerations due to the rotation that are also sensed by the accelerometer 9. The centrifugal acceleration 18 is therein dependent on the angular speed of the rotation movement and the Euler acceleration 19 is dependent on the angular acceleration. The gravitational acceleration g can in many embodiments be substantially perpendicular to the paper plane, respectively substantially in about the same direction as the rotation axis, which is regularly the case in surveying instruments configured with a vertical axis but not strictly mandatory.

The centrifugal acceleration 18 can be expressed vectorial by $-\vec{\omega}\times(\vec{\omega}(\vec{\omega}\times\vec{r})$. The Euler acceleration 19 can be expressed vectorial by $$\frac{d\vec{\omega}}{dt}\times\vec{r}.$$

In order to derive an actual inclination or tilt value of the instrument (respectively of the rotation axis 2*a* relative to gravity direction g), those additional accelerations—as present during a movement—have to be counted away from the measurements.

For the calibration, the accelerometer 9 is modeled. In the here explained example, a linear modeling will be discussed in view of understandability and simplicity. Such a linear modeling can also be sufficient for many embodiments, but the present disclosure can also be worked with a modeling of higher order, in particular in embodiments where increased accuracy is required and/or when specific (non-linear) sensor-peculiarities of the used accelerometer need to be addressed. Such a linear modeling can in particular be embodied to comprise a bias b for each axis and a sensitivity matrix S.

In an example of an embodiment, the accelerations sensed by a three-axis acceleration sensor 9 can be expressed in a linear model by:

$$f_m = Sf^S + b + \eta$$
$$f^S = R(\alpha)f^T$$

with:

- $f_m$ accelerometer measurement (3×1 vector for three axis)
- $f^T$ true acceleration (specific force), w.r.t. turret frame
- S sensitivity matrix (3×3 matrix)
- b sensor bias (3×1 vector)
- $\eta$ sensor noise (3×1 vector)
- $f^S$ true acceleration (specific force) w.r.t. sensor frame
- R(□) rotation between turret/azimuth axis and sensor frame (3×3 matrix)
- □ parameter for the rotation mechanism.

The kinematic considerations at a rotating accelerometer 9 can e.g. be expressed as:

$$f^T = -\omega^2 \begin{bmatrix} r^{T1} \\ r^{T2} \\ 0 \end{bmatrix} - \dot{\omega} \begin{bmatrix} -r^{T2} \\ r^{T1} \\ 0 \end{bmatrix} + g \underbrace{\begin{bmatrix} -\overline{v}_Q \cos \mathrm{Hz} + \overline{v}_L \sin \mathrm{Hz} \\ -\overline{v}_Q \sin \mathrm{Hz} - \overline{v}_L \cos \mathrm{Hz} \\ \sqrt{1 - \overline{v}_Q^2 - \overline{v}_L^2} \end{bmatrix}}_{e_{G3}^T(Hz, \overline{v}_Q, \overline{v}_L)},$$

with:

ω Angular velocity about Hz axis (scalar)

$r^T$ Sensor position w.r.t. the turret frame, $r^T=[r^{T1}, r^{T2}, r^{T3}]$ g Gravity of Earth (scalar)

Hz angle of rotation from encoder (Horizontal angle)

$\overline{v}_Q$, $\overline{v}_L$ Inclination w.r.t. standing base frame $\Sigma_S$ $v_Q$, $v_L$ Inclination w.r.t. turret frame $\Sigma_T$.

The dynamic or kinematic of a rotating accelerometer 9 can e.g. be described as in the formula above. This formula can also be expressed using vector- and cross-product notations, e.g. in line with the figure—which is here omitted in view of readability, but can be advantageous in some embodiments or to implement more a generic software modules or to implement and/or use software libraries or the like. The therein required angular velocity value ω as well as an angular acceleration value α can be derived from the angular readings of the instruments encoder 5*a*. For example, a time derivative of the angle readings φ as $$\omega_z = \frac{d\varphi}{dt}$$

and as second time derivative $$\propto_z = \frac{d^2\varphi}{dt^2}$$

can be established, preferably combined with some filtering, smoothing calculations or enhanced algorithm for doing so to avoid noise and spikes in the derivative signal, which can e.g. comprise modeling of the mechanical system and its dynamics.

A rotation Ra, Ra' in the majority of embodiments, the moving is provided by a drive unit for the axis 2*a* of the instrument. Such a drive unit can in particular be configured to provide a rotation Ra, Ra' at a substantially constant speed co, at least during certain phases of the movement, and optionally also to have defined or at least limited acceleration and/or jerk values of the movement. In some embodiments the speed and/or acceleration can also be at least partially used or derived conjoint by the calibration and the drive unit. The rotation can e.g. be provided in form of a specified movement trajectory for the axis 2*a*, 2*a*', preferably wherein the movement trajectory is specifically configured to result a movement that comprises movement subsections which are advantageous to derive a robust calculation of the calibration. Preferably, a movement trajectory with at least two sections of different constant rotation speeds for each accelerometer orientation is used as basis for calculating the calibration data and deriving the tilt of the instrument, preferably wherein the rotation speeds co and the position r are configured to result in acceleration values that are within a valid sensitivity range of the accelerometer 9 and represent statistically significant results. In embodiment with an accelerometer having stable sensitivity characteristics, a bias of the accelerometer can also be calibrated with at least one constant rotation speed.

The calibration enables to derive the whole sensitivity matrix S or at least a subset (like e.g. at least the diagonal elements) thereof as calibration parameters. For example, an estimator-, adjustment calculus or the like can be applied to the model discussed above. It also derives a bias of the accelerometer readings as calibration parameters. In case of a field calibration of a subset of the parameters only, the remaining calibration parameters and/or parameters on which the calibration bases, can be stored and recalled, e.g. from a previous complete or extended calibration procedure. Such a special extended calibration procedure can e.g. require extended time, exact physical leveling of the instrument, defined external references and/or other specific parameters, and is not designed to be executed at each startup of the instrument or during regular usage of the instrument, but can also comprise principles of the presently disclosure.

Figure 15:
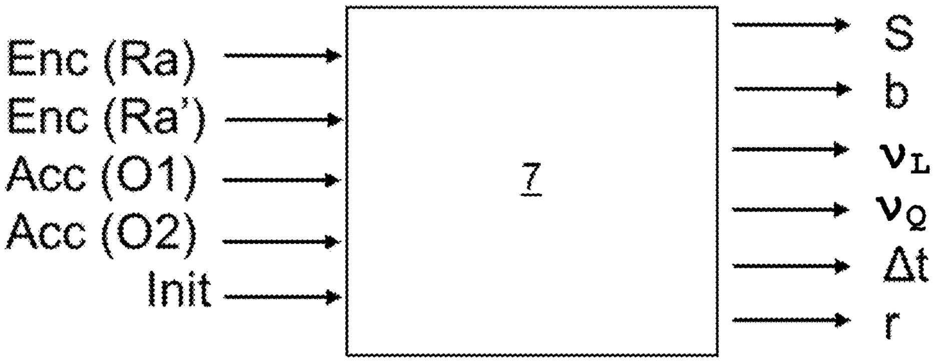
FIG. 15 shows an Input-Output-diagram of an embodiment of a calibration unit.

FIG. 15 shows an Input-Output-diagram of an embodiment of a calibration unit 7. It takes inputs in form of first encoder readings Enc(Ra) of an encoder (5*a* in FIG. 2*a*) at the instruments rotational axis 2*a* (see FIGS. 2*a* and 13) with the accelerometer (9 in FIGS. 2*a,c*) in the first orientation (orientation O1 resp. rotation Ra in FIG. 13), which axis 2*a* also moves the measurement direction of the instrument and which encoder also derives the angle of the measurement direction for the spatial measurement results of the instrument. Further, it takes inputs in form of second encoder reading Enc(Ra') of the encoder 5*a* for rotation with the accelerometer in the second orientation (orientation O2 and rotation Ra' in FIG. 13), which corresponds to a second, non-parallel rotational axis (2*a*' in FIG. 13).

It also takes inputs in form of accelerometer readings Acc and Acc from an acceleration sensing element at a time in a first orientation O1 and at another time in a second orientation O2. The accelerometer is located at a distance r from the rotational axis. The calibration unit 7 can optionally have knowledge of the position $\vec{r}$ of the sensor, given as a fixed stored value or optionally derived and/or refined, e.g. estimated and outputted together with the other parameters as indicated in the figure.

As another option, shown in the figure, the calibration unit 7 can also take other initialization values Init as input, e.g. at least part of the calibration values that can be considered fixed or which can provide starting values for the deriving of the calibration parameters, (e.g. derived theoretically, in a factory calibration or from former executions of the calibration), or for example the rotation R(a) between turret/azimuth axis and sensor frame.

Preferably, the readings of the accelerometer Acc,Acc and the readings of the encoder Enc(Ra),Enc(Ra') are substantially synchronized in time or have a known or defined timing with respect to one another. Optionally as depicted and if given, a time delay Δt between the readings of the accelerometer and of the encoder can also be derived in the calibration and considered in the calculations of the calibration parameters.

In an embodiment, there can be a trigger signal for synchronizing the readout of the encoder and the accelerometer or there can be a (preferably global) time-stamp clock for the readout of the accelerometer and the encoder. In embodiments, where the accelerometer readouts Acc,Acc cannot be triggered precisely, it can be read out periodically and a synchronization to an encoder reading Enc(Ra),Enc (Ra') can be established by time stamping, wherein a residual jitter in the readout can remain. In particular, in a well-designed implementation where primarily well-defined constant speed movement phases are evaluated, influences of such a jitter can be designed to be negligible. In embodiments where acceleration phases of the movement or dynamic movement profiles are evaluated for the calibration, a synchronized, triggered or precisely time-stamped readout of accelerometer and encoder can be more pressing to achieve decent signal quality for a precise calibration.

In an embodiment with a latency between the encoder and the accelerometer readings Enc(Ra),Enc(Ra'), Acc,Acc this latency can also be estimated and considered in the deriving of the calibration parameters S,b and/or of the tilt of the instrument $v_L$,$v_Q$ as part of the deriving of the calibration parameters.

The calibration unit 7 thereof derives calibration parameters for the accelerometer readings, respectively thereby calibrated accelerometer readings as calibrated leveling- or tilt-information $v_L$,$v_Q$ of the instrument. In this example, the calibration parameters are illustrative shown as a sensitivity matrix S for the measurement axes of the accelerometer and as a bias value b for each of the measurement axes of the accelerometer. In other embodiments maybe other and/or additional parameters can be derived, in particular in view of a modeling of the accelerometer. For example here shown is a time-delay parameter Δt, which reflects timing differences between the readings of the accelerometer and of the encoder as said above.

The calibration unit 7 is configured to work on input data readings which are derived during calibration routine in which the axis of the instrument moves, which means that the accelerometer is in movement with respect to the inertial frame, in an embodiment preferably in pure rotational movement around the instrument axis in the first and in the second orientation.

The rotation-speed or angular rate of the accelerometer can therein be derived from the angular readings Enc(Ra), Enc(Ra') the axis-encoder over time. In most embodiments, the angular rate is set to a desired value or trajectory for or by the calibration routine by configuring a drive unit of the axis to a desired trajectory of movement. The calibration is therein specifically executed with a variation of the rotational speed of the instrument during the calibration routine, in a dynamic state during the rotation. In an embodiment, e.g. a first speed of rotation is used and at least a second speed of rotation is used, in each case for both orientations of the accelerometer, and the calibration parameters are calculated, e.g. in view of above formulated calculations.

The raw, uncalibrated acceleration sensor measurement values for each rotational speed, have an offset to the respectively corresponding calibration result which can be defined according to the above described linear model by:

$$\text{Offset} = S(\omega \times (\omega \times r)) + b,$$

with the symbols as described above.

As another example, a non-linear least square approximation or another mathematical approach can be applied to the (overdetermined) system of equations (e.g. above mentioned convention 1 or 2) on basis of the data from the accelerometer and encoder during the rotation in order to resolve the unknown parameters as e.g. $v_L$, $v_Q$, b and/or S (or part of S). As already mentioned, not in every case or at every time a full calibration needs to be executed but e.g. only the bias b and e.g. the diagonal elements of the matrix S are calibrated in the field or online in course of a surveying when the leveling reference is to be established.

For the surveying-measurements to derive spatial information of target objects, which are taken by the instrument, an inclination or tilt $v_L$, $v_Q$ of the instrument, in particular of its rotation axis is derived based on the calibration or preferably during the calibration itself. The tilt $v_L$, $v_Q$ of the instrument is preferably derived during or at least right after the calibration and then considered to be fixed until a further execution of the calibration, as the accelerometer is at risk to drift off the calibration parameters over time and therefor the calibration might not be guaranteed to be sufficiently accurate for later on usages. Yet, the calibration can be re-executed from time to time or on demand in the field, e.g. in measurement pauses or advantageously even during regular instrument movement during the measurement which fulfill or are adapted to have a trajectory that is usable for deriving calibration results, e.g. movements with defined, different constant speeds over a reasonably large angular sector. Such a non-continuous tilt measurement can also help to save energy.

For example, the tilt $v_L$, $v_Q$ of the instrument is derived when setting up the instrument in the field. In initial movement of the instrument along a defined trajectory, the accelerometer- or tilt-calibration can be executed, e.g. similar to or combined with the movement that is already implemented in many instruments, e.g. for a calibration of the encoders and/or for other system check-ups, also referred to as initializing "dance" of the instrument, such an anyway given initialization movement of the instrument can be configured to be used to derive at least a bias and sensitivity calibration of the accelerometer and deriving an accurate instrument tilt $v_L$, $v_Q$ by a simple MEMS accelerometer. However, as said, the present disclosure allows for calibration during actual surveying/measurement point collection, too.

Figure 16:
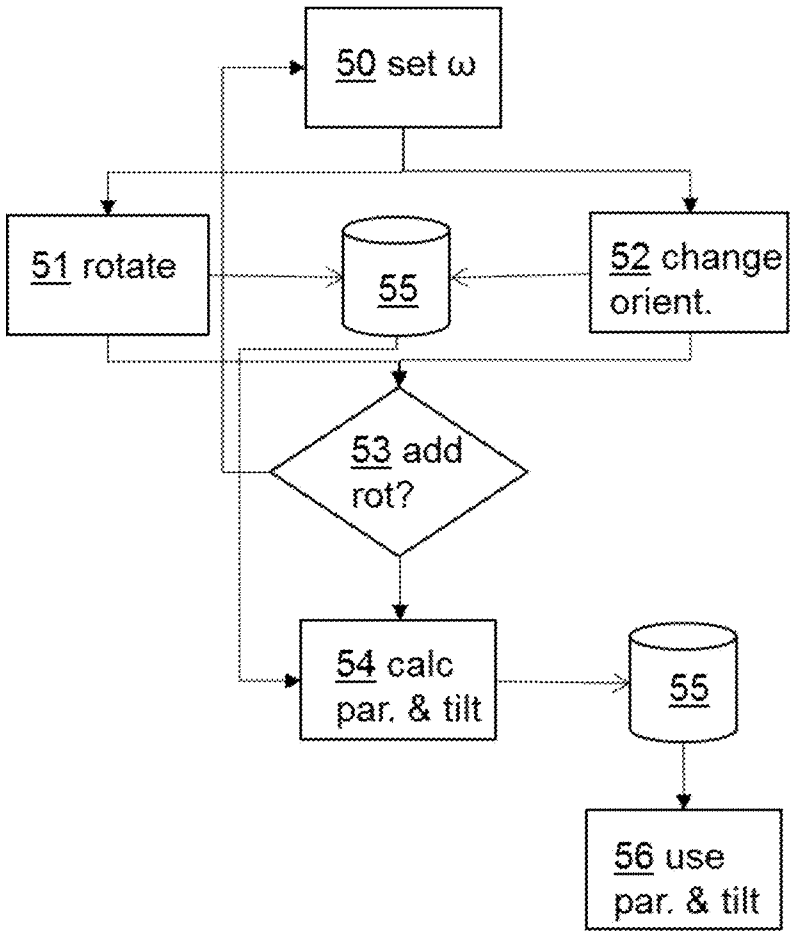
FIG. 16 shows a process diagram of an example of a tilt measurement calibration.

FIG. 16 shows a process diagram of an example of a tilt measurement calibration. In this example two different speeds of rotation of the instrument are used, which is not limiting. Such a field-calibration can comprise:

As symbolized in Box 50 a setting of a rotating movement trajectory about the instruments azimuthal axis at a first angular speed.

First acquiring of measurements from the acceleration sensor and from an angle encoder at the instrument's azimuthal axis while rotating the accelerometer about this axis, thereby having at least two different orientations of the accelerometer, for example move the accelerometer by the independent mechanism described above two to eight times per full revolution, which acquiring is preferably synchronized—as symbolized in Box 51 by recording and storing of measurement values from accelerometer and angle encoder during rotating and Box 55 symbolizing a storage memory.

Rotating the instrument axis with at least a further angular speed while changing the accelerometer's orientation—as symbolized in Box 53 by a further rotating movement, which repeats Box 50 and 51 e.g. with at least a second acquiring of measurements from the acceleration sensor and from an angle encoder at the instrument axis.

Deriving calibration parameters, in particular a bias-parameter and at least a subset of a sensitivity matrix-parameter of the acceleration sensor based on the acquired measurements, in particular comprising a mathematical estimation calculation—as symbolized in Box 54 by calculating and/or mathematically estimating calibration parameters and inclination of the surveying instrument and in Box 55 symbolizing the storage memory providing and/or storing the derived values for further usage.

Utilizing the derived tilt values for the measurements by the surveying instrument—as symbolized in Box 56 by utilization of inclination for measurements.

When the initial tilt is derived, the instrument can be considered to be stationary as the calibration parameters for the accelerometers can be subject to drift and not long time stable. In embodiments, the calibration of the accelerometer can also be repeated, either in dedicated tilt calibration moves or tilt measurement moves of the instrument, and/or during appropriate moves during usage of the instrument (like a target search move, an appropriate measurement target aiming move, a scanning move, etc.)

A skilled person is aware of the fact that details, which are here shown and explained with respect to different embodiments, can also be combined with details from other embodiments and in other permutations.

The invention claimed is:

1. A surveying instrument, in particular a Theodolite, Total-Station, Rotating Laser, Layout-Tool, Laser-Tracker or Laser-Scanner, comprising:

at least one rotational movement axis, in particular an azimuth axis, which is for providing a positioning of a targeting direction of the surveying instrument, a rotational position encoder configured for deriving a rotational direction value around the rotational movement axis and an acceleration sensor, in particular a MEMS-accelerometer, for deriving a leveling for the surveying instrument and being rotatable around the rotational movement axis in different rotational positions, a mechanism designed to move the acceleration sensor from a first orientation to at least a second orientation, the second orientation being different from the first orientation, wherein the mechanism is designed and arranged in such a way that the targeting direction is uninfluenced by a movement of the acceleration sensor by the mechanism and an evaluation unit configured to derive a calibrated leveling for the surveying instrument from position encoder readings in at least a first and a different, second rotational position of the acceleration sensor around the rotational movement axis and acceleration sensor readings in the first orientation and in the second orientation.

2. The surveying instrument according to claim 1, wherein the first and the second orientation are well-defined by design of the mechanism.

3. The surveying instrument according to claim 1, comprising a measuring unit for measuring the first and the second orientation.

4. The surveying instrument according to claim 1, wherein the mechanism is designed to provide exactly two different orientations.

5. The surveying instrument according to claim 1, wherein the mechanism is designed to provide a multitude of different orientations, in particular by enabling a 360°-rotation of the acceleration sensor.

6. The surveying instrument according to claim 1, wherein the mechanism comprises a shaft for moving the acceleration sensor from the first orientation to the second orientation by rotation of the shaft.

7. The surveying instrument according to claim 1, wherein the first and second orientation are provided by a first and a second limit stop of the mechanism, in particular tilt stops of a seesaw or of a tipper.

8. The surveying instrument according to claim 1, wherein the acceleration sensor is part of an inertial measurement unit and the mechanism is designed to move the inertial measurement unit from a first orientation in at least a second orientation and the derivation of the calibrated leveling comprises determination of at least one calibration parameter of the inertial measurement unit and/or a kinematic parameter of the instrument.

9. A method for determining a calibrated leveling of a surveying instrument with an acceleration sensor, comprising:

moving of the acceleration sensor around a rotational movement axis of the instrument, the acceleration sensor posing in a first orientation and in a second orientation of the accelerometer at different rotational positions with respect to the rotational movement axis, the second orientation being different from the first orientation, whereby a targeting direction of the surveying instrument is independent of the acceleration sensor's orientation, acquiring of at least a first and a different, second rotational position reading of the moving by a rotational position encoder for the rotational movement axis, sensing of a respective acceleration in the first orientation and in the second orientation by the acceleration sensor as acceleration sensor readings, and deriving the calibrated leveling from the first and the second rotational position readings and the acceleration sensor readings.

10. The method according to claim 9, wherein the acceleration sensor is one or more o: a Theodolite, a Total-Station, Rotating Laser, Layout-Tool, Laser Tracker or a Laser-Scanner.

11. The method according to claim 9, the method comprising surveying simultaneous to the determining of the calibrated leveling, whereby the angular speed and/or an angular extent of at least a portion of the moving is determined by a measurement parameter of the surveying.

12. The method according to claim 9, wherein the moving comprises at least a portion of constant angular speed and/or at least a first and a second portion of rotational movements of different angular speeds, whereby the accelerometer is provided in both orientations in each moving portion, based on which the calibration leveling is derived, in particular whereby the first and the second moving portion sum up to a 360°-rotation or a multiple of a 360°-rotation.

13. The method according to claim 9, further comprising deriving of at least one calibration parameter from the first and the second rotational position readings and the acceleration sensor readings and verifying if the calibration parameter is within a defined tolerance.

14. The method according to claim 9, further comprising determining an orientation of the rotational movement axis and choosing at least one of the first and second orientation of the acceleration sensor dependent on the determined orientation of the rotational movement axis.

15. The method according to claim 9, wherein the first and second orientation are well-known and/or well-defined with respect to the rotational movement axis.

16. A computer program product comprising program code which is stored on a non-transitory machine-readable medium, and having computer-executable instructions for performing a method when executed on a processing unit of a surveying instrument according to claim 1.

17. A computer program product comprising program code which is stored on a non-transitory machine-readable medium, and having computer-executable instructions for performing, when executed on a processing unit of a surveying instrument, the method according to claim 9.

18. A computer program product comprising program code which is stored on a non-transitory machine-readable medium, and having computer-executable instructions for performing, when executed on a processing unit of a surveying instrument, the method according to claim 15.

* * * * *